United States Patent [19]

Wantuck

[11] Patent Number: 4,977,560
[45] Date of Patent: Dec. 11, 1990

[54] NEAR-PERFECT DIFFRACTION GRATING RHOMB

[75] Inventor: Paul J. Wantuck, Santa Fe, N. Mex.

[73] Assignee: The United States of America as represented by the United States Department of Energy, Washington, D.C.

[21] Appl. No.: 373,532

[22] Filed: Jun. 30, 1989

[51] Int. Cl.$^5$ ............................................... H01S 3/00
[52] U.S. Cl. .......................................... 372/2; 372/102
[58] Field of Search ........................... 372/2, 102, 700; 350/168

[56] References Cited

U.S. PATENT DOCUMENTS

| 3,675,154 | 7/1972 | Duguay et al. | 372/102 |
| 4,287,486 | 9/1981 | Javan | 372/102 |
| 4,748,629 | 5/1988 | Edlin et al. | 372/102 |
| 4,845,718 | 7/1989 | Pistoresi | 372/102 |

FOREIGN PATENT DOCUMENTS 2493054  4/1982  France ................................ 372/102

OTHER PUBLICATIONS

German; "Diffraction Grating Tuners for CW Lasers"; *Applied Optics*; vol. 18, No. 14; Jul. 1979; pp. 2348, 2349.
E. A. Treacy, "Optical Pulse Compression with Diffraction Gratings," IEEE J. of Quantum Electron, vol. QE-5, No. 6, pp. 454–458, (Sep. 1969).
R. L. Tokar et al., "Sideband Suppression in Free-Electron Lasers Using a Grating Rhomb," IEEE J. of Quantum Electronics, vol. 24, No. 6, pp. 856–863, (Jun. 1988).

*Primary Examiner*—John D. Lee
*Assistant Examiner*—Robert E. Wise
*Attorney, Agent, or Firm*—Ray G. Wilson; Paul D. Gaetjens; William R. Moser

[57] ABSTRACT

A near-perfect grating rhomb enables an output beam to be diffracted to an angle offset from the input beam. The correcting grating is tipped relative to the dispersing grating to provide the offset angle. The correcting grating is further provided with a groove spacing which differs from the dispersing grating groove space by an amount effective to substantially remove angular dispersion in the output beam. A near-perfect grating rhomb has the capability for selective placement in a FEL to suppress sideband instabilities arising from the FEL.

8 Claims, 3 Drawing Sheets

NEAR-PERFECT DIFFRACTION GRATING RHOMB

BACKGROUND OF INVENTION

This invention relates to optical systems and, more particularly, to diffraction gratings for use in laser resonators. This invention is the result of a contract with the Department of Energy (Contract No. W-7405-ENG-36).

A grating rhomb is formed from a pair of plane ruled gratings having identical groove spacings, with the rulings aligned and with the faces parallel. Such rhombs are identified as perfect grating rhombs and have the feature that the time delay of a light beam through the rhomb is an increasing function of wavelength. The first grating introduces a dispersion of the incident light as a function of frequency so that the path length and concomitant transit time through the rhomb is different for the different wavelengths. The second grating corrects the dispersion to provide output light of a selected order which is parallel to the input light beam. The theory of grating rhombs is generally described in E. Treacy, "Optical Pulse Compression with Diffraction Gratings," IEEE J. of Quantum Electronics, vol. QE-5, No. 9, pg. 454 (September 1969).

As discussed by R. L. Tokar et al., "Sideband Suppression in Free-Electron Lasers Using a Grating Rhomb," IEEE J. of Quantum Electronics, vol. 24, No. 6, pg. 856 (June 1988), incorporated herein by reference, a particular application of a grating rhomb is to reduce sideband instabilities in a free-electron laser (FEL). The growth of light in a FEL can occur at wavelengths other than the fundamental wavelength, i.e., sidebands, which results in a reduced amount of energy being extracted from the electron beam at the fundamental wavelength, thereby lowering the laser efficiency.

A perfect grating rhomb has been shown to suppress these sideband instabilities in a FEL. The FEL oscillator cavity length is selected such that the optical pulse at a selected wavelength and the pulse of electrons in the wiggler overlap spatially in the wiggler regions whereby the fundamental wavelength light is amplified. Light at wavelengths other than the fundamental wavelength is temporally and spatially displaced by a rhomb from the electron pulse and is not amplified. Further, the angular dispersion introduced by the first rhomb grating causes sideband light components to be transversely displaced at the rhomb exit for further suppression.

In the conventional perfect grating rhomb discussed above, the output beam is parallel to the input beam at the fundamental frequency. There are, however, instances where it would be desirable to have the output beam angularly offset from the input beam. For example, the location of a rhomb in a FEL for sideband instability suppression may require some angular alignment capability to complete the ring resonator path within predetermined geometric constraints. Some angular offset can be obtained by tilting the second grating relative to the first grating. However, this tilting introduces an angular dispersion in the output beam which can greatly reduce the beam energy extraction efficiency from the electron pulse. It would be desirable to introduce an angular offset between the rhomb input and output beams without increasing the beam dispersion.

Accordingly, one object of the present invention is to obtain an angular offset between the input and output beams of a rhomb.

Another object is to minimize beam angular dispersion in a rhomb output beam with an output grating which is not parallel to a beam input grating.

One other object is to provide a FEL having a rhomb in the ring resonator for sideband instability suppression.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a grating rhomb having a grating effective for diffracting an output light beam at an angle offset from an input light beam while maintaining the angular dispersion of the output beam within selected limits for a given output beam bandwidth.

In another characterization of the present invention a free electron laser having a wiggler for increasing the energy of light at a predetermined wavelength and mirrors forming a ring resonator for the light includes a grating rhomb for suppressing sideband instabilities where a grating in the rhomb is effective for diffracting an output light beam at an angle offset from an input light beam while maintaining the angular dispersion of the output beam within selected limits for a given beam bandwidth.

A near-perfect grating rhomb includes a different groove spacing in the first and second gratings where the difference is selected to substantially eliminate angular dispersion in the output beam when the second grating is tilted to provide the desired angular offset between the input and output beams at the fundamental frequency.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
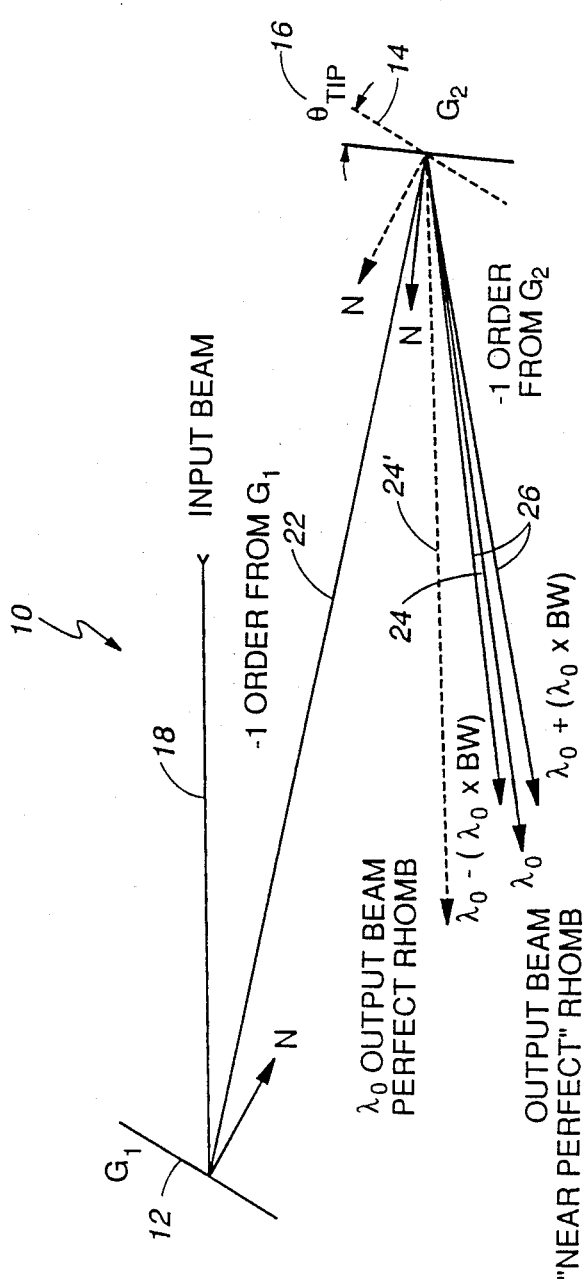
FIG. 1 is an illustration of rhomb performance in accordance with the present invention.

In accordance with the present invention, a near-perfect rhomb has a correcting grating tilted at a selected angle relative to an input dispersing grating and a relative groove spacing difference with the dispersing grating to produce an output beam ray angle which is offset from the input beam angle while satisfying angular dispersion constraints on the output beam. FIG. 1 illustrates the near-perfect rhomb configuration. Near-perfect rhomb 10 includes dispersing grating 12 for diffracting input light beam 18 and introducing a dispersion into traversing beam 22. Correcting grating 14 diffracts beam 22 to remove the angular dispersion introduced by grating 12 in output beam 24.

As indicated in FIG. 1 grating 14 is tilted at an angle $\theta_{tip}$ 16 relative to dispersing grating 12. Tip angle 16 produces output beam 24 at an angle relative to input beam 18. A perfect rhomb configuration is shown by the dashed line components in FIG. 1 and would produce diffracted output beam 24' parallel to input beam 18. In a perfect rhomb, however, correcting grating 14 would have a diffraction groove spacing which is identical with the groove spacing of dispersing grating 12 and the tip angle 16 would introduce an angular dispersion 26 for output wavelengths in a bandwidth about the fundamental wavelength 24. For application to a FEL, it is desired to maintain the angular dispersion less than one (1) microradian to prevent excessive losses in the light beam in the resonator ring. However, an offset angle of about 1° between the input beam 18 and output beam 24 is also desired in order to maintain the required resonator ring geometry. Excessive angular dispersion would be obtained in a perfect rhomb by introducing such an offset angle.

Figure 2:
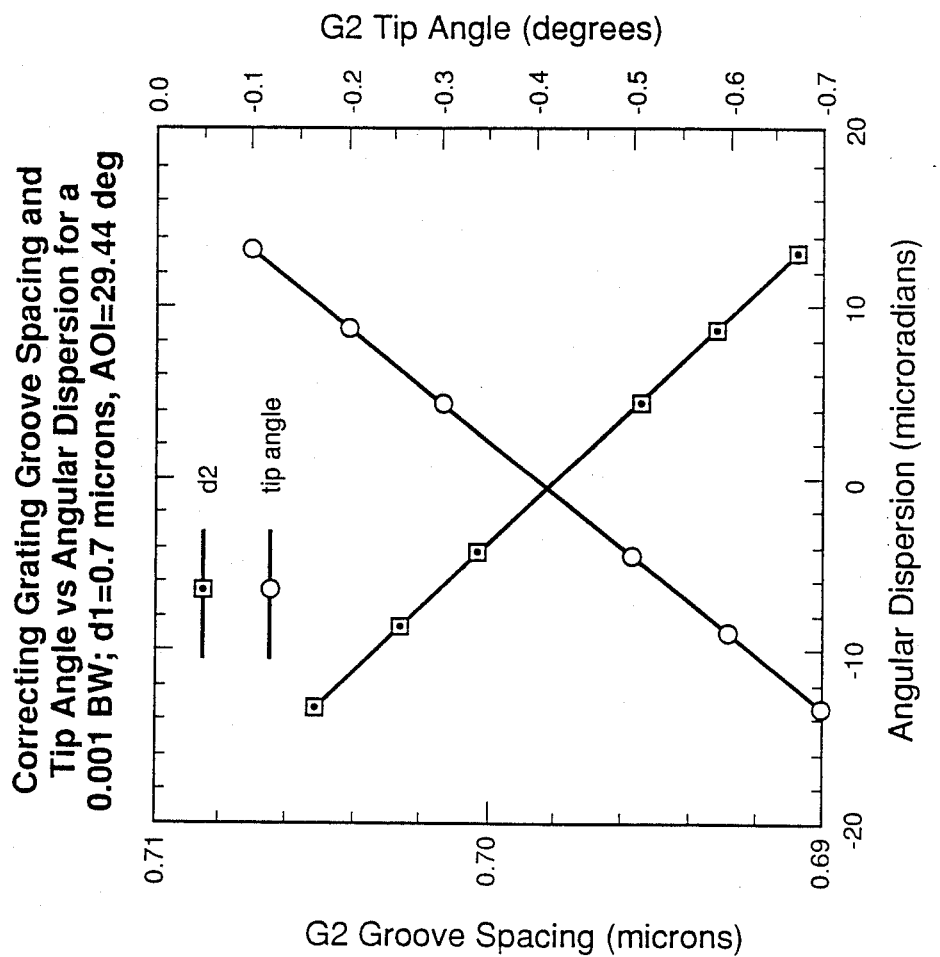
FIG. 2 is a graph depicting the relationship between a second grating groove spacing, tip angle, and angular dispersion for a particular first grating groove spacing and angle of incidence.

As herein discussed, it is found that a near-perfect rhomb configuration, i.e. non-parallel grating with different diffraction groove spacings, can satisfy the constraints of both the output beam angularly offset from the input beam and substantially no angular dispersion of the output beam. By way of example, FIG. 2 illustrates the necessary relationships between dispersing grating 18 and correction grating 24 (FIG. 1). Dispersing grating 18 may have a groove spacing $d_1$ of 0.7 microns with an input beam angle of incidence of 29.44° and relative bandwidth BW of 0.001. Using conventional diffraction equations, the effects on angular dispersion of the tip angle $\theta$ and the groove spacing $d_2$ of correcting grating G2 14 are shown. A tip angle of $-0.397°$ (a counter clockwise rotation from a parallel grating configuration) and a groove spacing of 0.678 microns result in substantially no angular dispersion at a resulting offset angle of about 1° for the output beam diffracted from correcting grating G2.

Thus, the correcting grating G2 can be adjusted in terms of groove period and angle of incidence to produce a first order diffracted beam with essentially zero dispersion and a diffraction angle which differs from the input beam angle of incidence to the dispersing grating G1. Such a pair of curves can be generated for any grating pair. The relative groove spacing required between gratings G1 and G2 at a selected tip angle will depend on the grating configuration and operating conditions. The calculations are, however, conventional once it is realized that a near-perfect rhomb configuration will enable the desired operating characteristics to be obtained.

Figure 3:
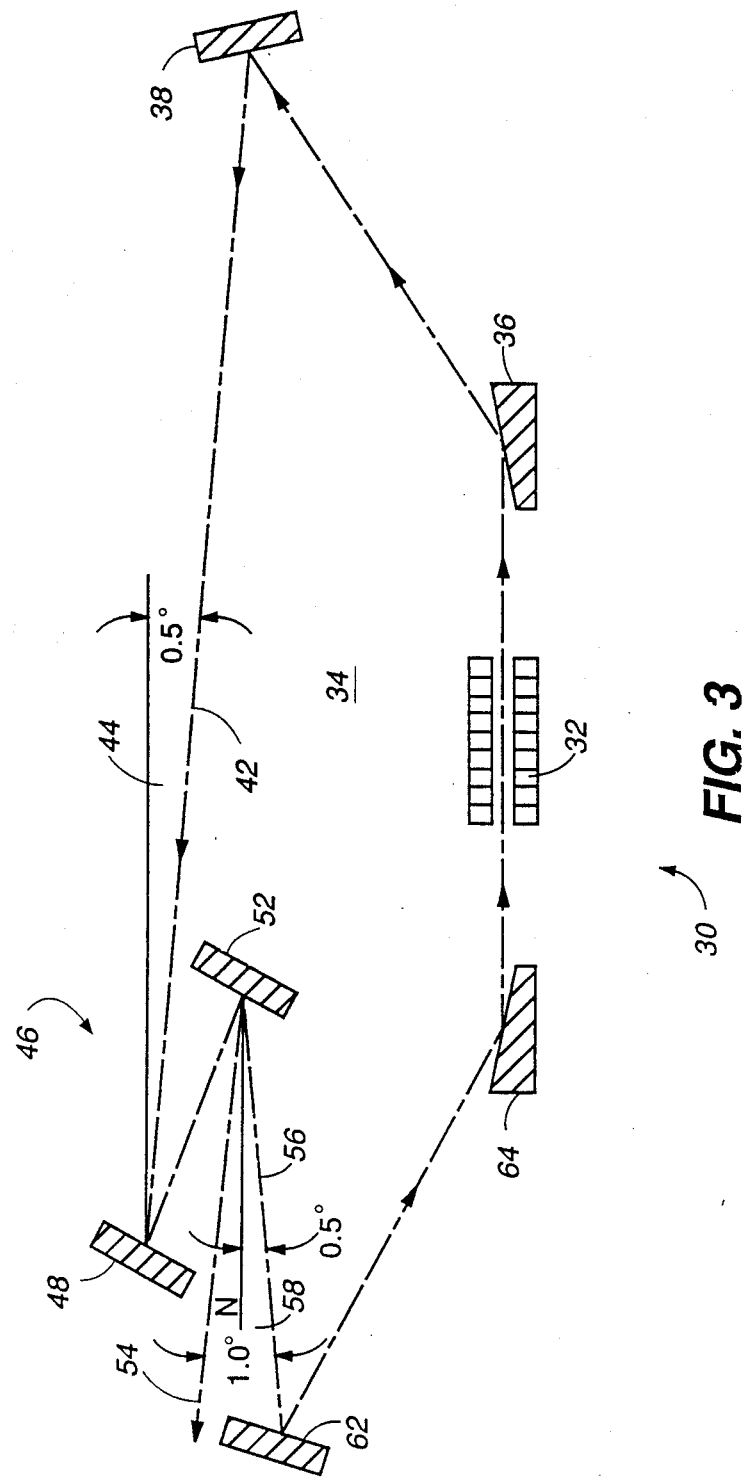
FIG. 3 is a schematic representation of a FEL including a near-perfect rhomb in the resonator ring.

Referring now to FIG. 3, there is shown a schematic representation of a FEL including a near-perfect rhomb 46 in the resonator ring 34. FEL 30 conventionally includes electron wiggler 32, which may be a tapered wiggler, downstream and upstream grazing mirrors 36, 64, and downstream and upstream paraboloid mirrors 38, 62. Grazing mirrors 36, 64 and paraboloid mirrors 38, 62 are arranged to form resonator ring 34 for repeatedly passing the light beam through wiggler 32 for amplifying the beam. Near-perfect rhomb 46 is included in resonator ring 34 for suppressing sideband instabilities as hereinabove discussed. In one embodiment, input beam 42 is angled at 0.5° relative to the horizontal and output light beam 56 is offset by an angle of 1° from output beam 54 from a perfect rhomb to complete the ring. A groove spacing difference of 22 angstroms between dispersing grating 48 and correcting grating 52, as discussed above, then provides the substantially zero angular dispersion to optimize the laser efficiency.

The capability of offsetting the output beam from the input beam enables the rhomb to be placed in a variety of locations in the resonator ring 34. By way of example, placement of the rhomb in the collimated leg of the resonator (input beam 42 of FIG. 3) would require separate vacuum chamber provisions for rhomb 46 while the angular offset capability enables rhomb 46 to be placed in an existing vacuum chamber. It will also be appreciated that application of the near-perfect rhomb is not limited to FEL's. The angular offset capability may have application to any high or low power laser resonators for beam sampling, outcoupling, or spectral bandwidth narrowing, as well as devices for spectral filtering.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A grating rhomb, comprising:
    a first grating having a first groove spacing for receiving an input beam at an angle of incidence and outputting a first diffracted beam; and
    a second grating angularly tilted relative to said first grating for receiving said first diffracted beam and outputting a second diffracted beam at an angle offset from said input beam, said second grating having a second groove spacing different from said first groove spacing by an amount effective to limit the angular dispersion of said output beam within selected limits for a given output beam bandwidth.

2. A grating rhomb according to claim 1, wherein said offset angle is about 1°.

3. A grating rhomb according to claim 2, wherein said angular dispersion is less than one microradian for a bandwidth up to 0.001.

4. A grating rhomb according to claim 3, wherein said second groove spacing difference is about 22 angstroms.

5. A free electron laser having a wiggler for increasing the energy of a light at a predetermined wavelength, mirrors forming a ring resonator for said light, and a grating rhomb for suppressing sideband instabilities, the improvement comprising:

a first grating in said rhomb having a first groove spacing for receiving an input beam at an angle of incidence and outputting a first diffracted beam; and a second grating in said rhomb angularly tilted relative to said first grating for receiving said first diffracted beam and outputting a second diffracted beam at an angle offset from said input beam, said second grating having a second groove spacing different from said first groove spacing by an amount effective to limit the angular dispersion of said output beam within selected limits for a given output beam bandwidth.

6. A free electron laser according to claim 5, wherein said offset angle is about 1°.

7. A free electron laser according to claim 6, wherein said angular dispersion is less than one microradian for a bandwidth up to 0.001.

8. A free electron laser according to claim 7, wherein said second groove spacing difference is about 22 angstroms.

* * * * *